Nov. 2, 1965   F. R. DRAKE   3,215,046
HYDRAULIC MOTOR SEAL
Filed Feb. 13, 1964   2 Sheets-Sheet 1
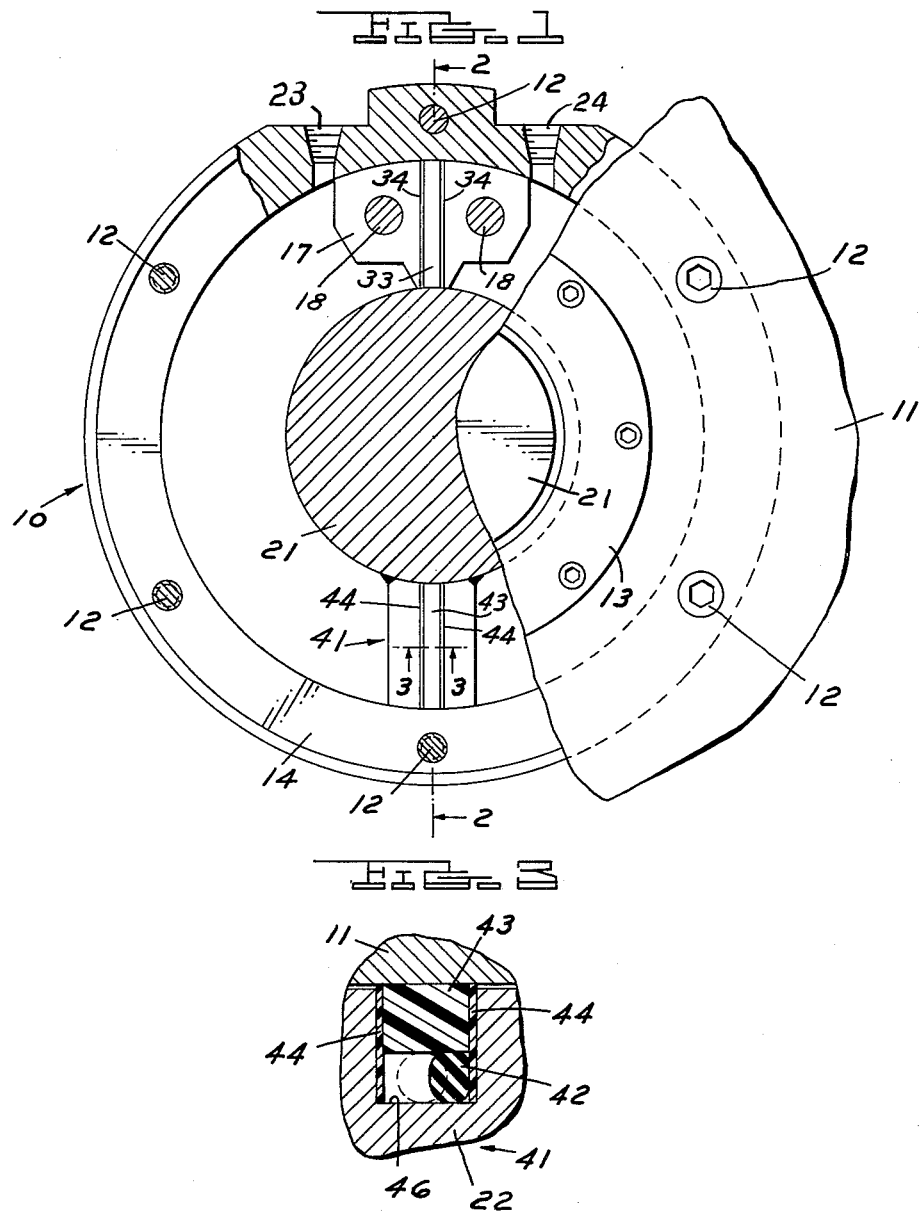
INVENTOR.
FREDERICK R. DRAKE
BY
Frank B. Hill
AGENT

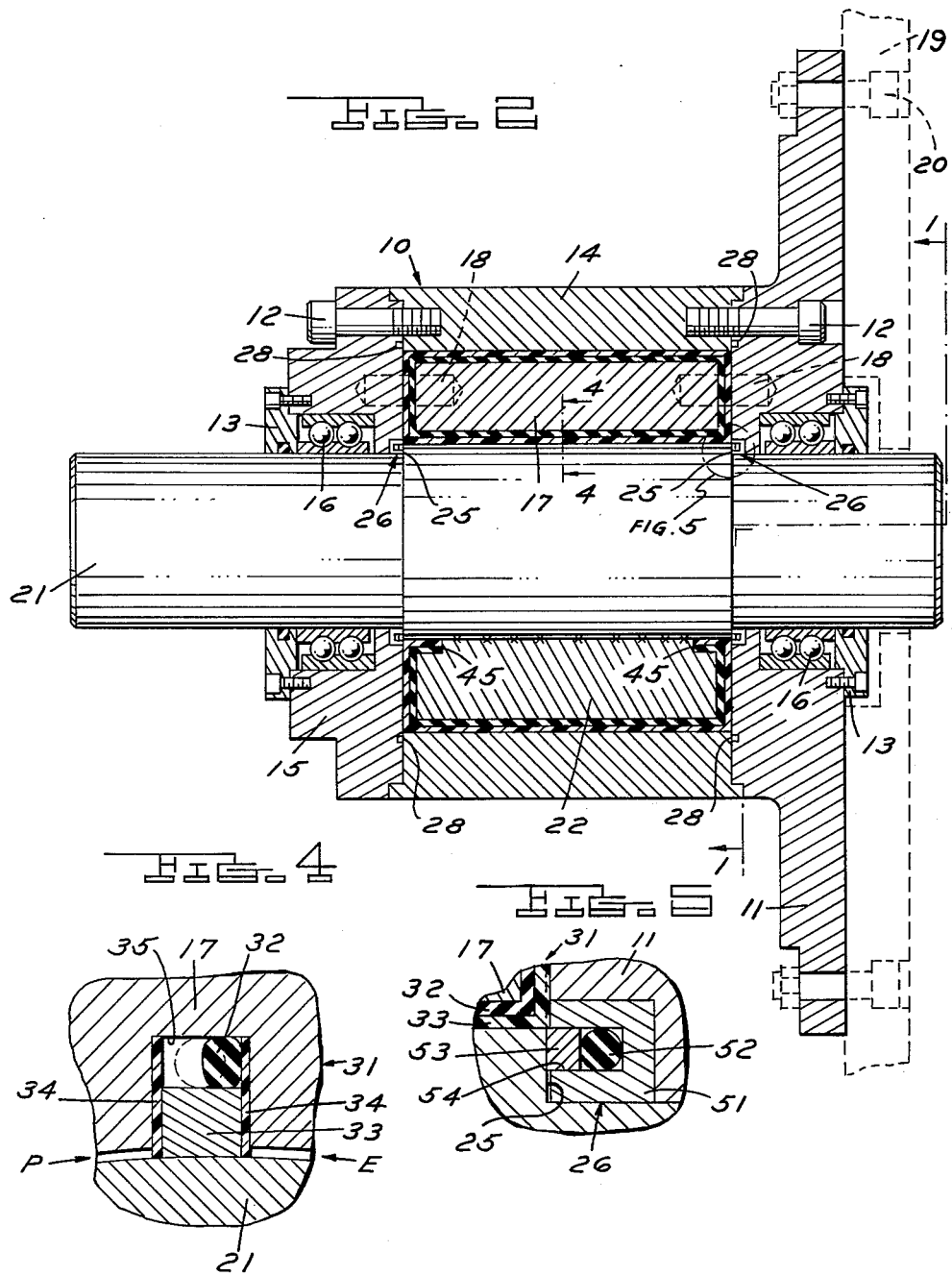

United States Patent Office 3,215,046
Patented Nov. 2, 1965

3,215,046
HYDRAULIC MOTOR SEAL
Frederick R. Drake, Greenville, Ohio, assignor to
Ex-Cell-O Corporation, Detroit, Mich.
Filed Feb. 13, 1964, Ser. No. 344,713
5 Claims. (Cl. 92—125)

This invention relates to fluid sealing in general and in particular to improvements in sealing pressurized fluids in expanding hydraulic motor chambers.

Hydraulic motors of this character have a radially disposed slidable vane or impeller mounted upon an axial shaft in the housing and forming fluid chambers with one or more fixed shoes. Mechanical clearance is maintained between the radial vane and the housing to permit rotational movement of the axial shaft and slidable vane with respect to the housing. The movement is obtained by applying pressure to one side of the vane, and movement may be terminated by contact with a fixed shoe. Under some conditions standard O-ring seals extrude through the mechanical clearance.

An object of this invention is to provide a new and improved type seal which can seal movable fluid chambers under high or low pressure system conditions without damage to the sealing means.

Another object of the present invention is to provide a sealing means capable of accomplishing the above objective with a minimum of material and fabrication cost, yet at the same time to provide a seal of simple and rugged construction that is very reliable in application.

Other objects and advantages of the invention will become apparent from the detailed description and from the appended claims, when considered in connection with the accompanying drawings, in which:

FIGURE 1 is a front elevation view of a hydraulic motor provided with the improved sealing means, in part broken to better illustrate the complete unit, taken along line 1—1 of FIGURE 2;

FIGURE 2 is a sectional side elevation view through the unit, taken along line 2—2 of FIGURE 1;

FIGURE 3 is an enlarged sectional view showing a cross section of the new sealing means, taken along line 3—3 of FIGURE 1;

FIGURE 4 is an enlarged sectional view showing a cross section of the new seal, taken along line 4—4 of FIGURE 2;

FIGURE 5 is an enlarged view of the cross section of the shoulder seal, taken from area 5 of FIGURE 2.

While the invention is susceptible of various modifications and alternative constructions, a certain illustrative embodiment has been shown in the drawings and will be described below in considerable detail. It should be understood, however, that there is no intention to limit the invention to the specific forms disclosed; but on the contrary, the invention is to cover all modifications, alternative constructions, and equivalents falling within the spirit and scope of the invention as expressed in the appended claims.

Referring generally to the figures, we have a hydraulic motor 10, front face panel 11, body housing 14, and rear face panel 15. The front and rear face panels 11 and 15 are secured to the body housing 14 by securing bolts 12. The motor 10 is mounted to a support member 20 by securing means 19. The cap members 13 are secured to the face panels in the usual manner. Shaft 21 passes through face panels 11 and 15, is rotatably supported by ball bearings 16, which are secured within face panels 11 and 15 by the cap members 13. Stationary shoe member 17 is within housing 14 and positioned along shaft 21 and is secured between front face plate 11 and rear face plate 15 by dowel pins 18. Slidable vane 22 is secured to shaft 21 in the usual manner; for example, by welding as illustrated in the present disclosure. Shaft 21 is rotated by applying pressure to one side of the vane 22 and exhausting the chamber formed on the opposite side of the vane 22 with stationary shoe 17. Inlet-exhaust ports 23 and 24 are provided for this purpose.

Shaft 21 has shoulder portions 25 to provide for seals 26 which prevent the fluid from escaping through the face panels 11 and 15. Static seals 28 are provided to prevent escape of the fluid through the outside portion of the body by sealing housing 14 with respect to face panel 11 and face panel 15. Stationary shoe seal 31 prevents fluid from moving across stationary shoe 17. Slidable vane seal 41 prevents fluid from moving past vane 22.

Referring generally to FIGURE 5 we have shoulder seal 26; this is made up generally of three elements, body 51, O-ring 52, seal ring 53. These elements are annular in nature circling shaft 21. Body 51 is housed in a notch in front face panel 11. O-ring 52 can be made of resilient material so that when finally assembled it will have a constant pressure on seal member 53 constantly urging it against the shoulder 25 of shaft 21. Seal ring 53 can be made of various materials such as thermoplastic. There will be a slight gap between shoulder portion 25 and the inside face of panel 11, permitting seal ring 53 to be in contact with stationary shoe seal 31 and slidable vane seal 41. The arrangement of shoulder seal 26 at the rear face panel 15 is similar to the arrangement of seal 26 in the front face panel 11 as just described.

Referring generally to FIGURES 2 and 4, stationary shoe seal 31 is made up of resilient member 32, seal member 33, and wiper members 34. The elements of shoe seal 31 are all housed within groove 35 which runs about stationary shoe 17 as viewed in FIGURE 2. As indicated in FIGURE 4, in an exaggerated manner, we have a clearance between stationary shoe 17 and the shaft 21 which permits the shaft to rotate within the housing 14 while shoe 17 remains stationary. As the pressure in the hydraulic motor 10 builds up on one side of the shoe 17, indicated as "P" in FIGURE 4, the fluid under pressure will pass between 17 and 21 into groove 35 acting on the resilient member 32 and rolling it to the opposite side of the groove 35. At this time the pressure in groove 35 will act against member 32 causing it to be formed into an oval shape. This will exert further pressure against seal member 33 and prevent passage of fluid from the "P" side of stationary shoe 17 to the "E" or exhaust side of shoe 17.

The wiper members 34 are placed on both sides of the groove 35 and extend out into physical contact with shaft 21 and they permit seal member 33 to be housed between them. As the shaft 21 rotates with respect to the stationary shoe 17, the wiper blades prevent the extruding of the seal member 33 in the gap between members 21 and 17. A typical material which may be selected for the wiper members would be tetrafluoroethylene resin which Du Pont is marketing under the trade name of Teflon. Another material could be Teflon reinforced with glass fiber.

Referring generally to FIGURES 1, 2, and 3 slidable vane seal 41 is made up of a resilient member 42, a seal member 43, and wiper members 44. These members are made into a C shape as viewed in FIGURE 2. Their operation is similar to that just described for stationary shoe seal 31. Their sealing function takes place between the slidable vane 22 and the housing 14, the front face panel 11 and the rear face panel 15. The free ends 45 of members 42, 43, and 44 will seal against the opposite wall of groove 46 when one side of vane 22 is pressurized. The other functions and operation of the elements are the same as discussed with reference to seal 31.

While the embodiment of the present invention herein disclosed constitutes a preferred form, it is to be understood that other forms might be adapted and still be within the spirit of the disclosed invention.

I claim as my invention:

1. A hydraulic motor assembly comprising:
    (a) two or more fluid chambers,
    (b) two or more obstruction members separating the fluid chambers,
    (c) a slot as part of an obstruction member,
    (d) a relatively stiff seal member of rectangular cross-section within the slot,
    (e) a resilient member of circular cross-section within the slot and under said seal member tending to force the seal against the fluid chamber wall, and
    (f) wiper members extending more than the full depth of said slot located on both sides of the seal and resilient member and contacting the chamber wall; and
    (g) the width of said seal member being greater than the diameter of said resilient member.

2. A hydraulic motor assembly according to claim 1 comprising:
    (a) said wiper members made of Teflon.

3. A rotary hydraulic motor assembly comprising:
    (a) a housing body member,
    (b) a rotatable shaft having a slidable vane secured to it,
    (c) said shaft is positioned within the body member,
    (d) a stationary shoe stationarily secured to the housing body and making sealed contact with the shaft,
    (e) a slot about the slidable vane opening toward the inside surface of the housing body member,
    (f) a resilient member of circular cross-section within the slot,
    (g) a relatively stiff seal member of rectangular cross-section within the slot between the resilient member and the inside surface of the housing,
    (h) wiper members extending more than the full depth of said slot located on both sides of the seal and resilient member and contacting the inside surface of the housing; and
    (i) the width of said seal member being greater than the diameter of said resilient member.

4. A hydraulic motor assembly according to claim 3 comprising:
    (a) a slot about the stationary shoe opening toward the shaft,
    (b) the sealing contact between the shaft and the stationary shoe is by a seal member of rectangular cross-section within the slot,
    (c) a resilient member of circular cross-section within the slot and acting on the seal member, and
    (d) wiper members extending more than the full depth of slot located on both sides of the seal and resilient member and contacting the shaft.

5. A hydraulic motor seal according to claim 4 comprising:
    (a) said wiper members made of Teflon reinforced with glass fibers.

References Cited by the Examiner

UNITED STATES PATENTS

| | | | |
|---|---|---|---|
| 2,349,170 | 5/44 | Jackman | 277—177 |
| 2,998,987 | 9/61 | Taschenberg et al. | |
| 3,030,934 | 4/62 | Herbst | 92—125 |

FOREIGN PATENTS

| | | |
|---|---|---|
| 1,271,678 | 8/61 | France. |

SAMUEL LEVINE, *Primary Examiner.*

RICHARD. B. WILKINSON, *Examiner.*